(12) United States Patent
Konzelmann et al.

(10) Patent No.: US 7,500,403 B2
(45) Date of Patent: Mar. 10, 2009

(54) ULTRASONIC FLOW SENSOR HAVING INTERLAID TRANSMITTING AND RECEIVING ELEMENTS

(75) Inventors: Uwe Konzelmann, Asperg (DE); Tobias Lang, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/583,903

(22) PCT Filed: Nov. 19, 2004

(86) PCT No.: PCT/EP2004/053023

§ 371 (c)(1),
(2), (4) Date: May 17, 2007

(87) PCT Pub. No.: WO2005/064283

PCT Pub. Date: Jul. 14, 2005

(65) Prior Publication Data

US 2008/0028868 A1      Feb. 7, 2008

(30) Foreign Application Priority Data

Dec. 29, 2003    (DE) ................. 103 61 763

(51) Int. Cl.
*G01F 1/84* (2006.01)
(52) U.S. Cl. ................. 73/861.29; 73/861.25
(58) Field of Classification Search ........... 73/861.25, 73/861.26–861.31
See application file for complete search history.

(56) References Cited

U.S. PATENT DOCUMENTS

| | | | | |
|---|---|---|---|---|
| 4,200,858 A | * | 4/1980 | Takashima | 367/135 |
| 4,586,512 A | * | 5/1986 | Do-huu et al. | 600/447 |
| 4,719,476 A | * | 1/1988 | Elrod et al. | 347/46 |
| 5,372,047 A | | 12/1994 | Russwurm et al. | |
| 5,677,491 A | * | 10/1997 | Ishrak et al. | 73/641 |
| 5,807,258 A | * | 9/1998 | Cimochowski et al. | 600/454 |
| 5,922,962 A | * | 7/1999 | Ishrak et al. | 73/632 |
| 5,967,989 A | * | 10/1999 | Cimochowski et al. | 600/459 |
| 2006/0241459 A1 | * | 10/2006 | Tai | 600/454 |

FOREIGN PATENT DOCUMENTS

DE     4416826       11/1995
WO    WO 02/055966   7/2002

OTHER PUBLICATIONS

Kraftfahr-technisches Taschenbuch / Bosch 23, erweiterte Auflage—Braunschweig, Wiesbaden, Vieweg, 1999, ISBN 3-528-0376-4, p. 115.

* cited by examiner

*Primary Examiner*—Harshad Patel
(74) *Attorney, Agent, or Firm*—Kenyon & Kenyon LLP

(57) ABSTRACT

An ultrasonic flow sensor for measuring the volumetric flow rate of a flowing medium through a flow channel having a transducer array which is situated within the flow cross section of the flow channel and which generates ultrasonic waves which propagate in the flow cross section of the flow channel transversally to a flow direction of the flowing medium, the ultrasonic transducer array having an interlaid arrangement of transducer elements which act alternately as transmitting and receiving antennas, so that all emitted individual sound waves interfere to form common wave fronts.

10 Claims, 4 Drawing Sheets

Fig. 1.1

ULTRASONIC FLOW SENSOR HAVING INTERLAID TRANSMITTING AND RECEIVING ELEMENTS

FIELD OF THE INVENTION

The air throughput in the intake and/or supercharge system of an internal combustion engine is measured using flow meters. Since the chemical process of combustion depends on the fuel to air mass ratio, the air mass throughput in the intake/supercharge system of the engine is to be measured, for which volume or back-pressure measuring methods are also being used. The maximum air mass flow to be measured is in the range between 400 kg and 1200 kg per hour, depending on the engine power. Due to the low idling consumption of today's internal combustion engines, the ratio from minimum to maximum air throughput is between 1:90 and 1:100.

BACKGROUND INFORMATION

The Bosch Automotive Handbook/Bosch 23rd updated and expanded edition, Braunschweig; Wiesbaden, Vieweg, 1999, ISBN 3-528-03876-4 page 115 describes an ultrasonic flow measuring system. This system allows the propagation time t of an acoustic pulse as it travels through a medium to be measured (e.g., air) at an angle of inclination $\alpha$. One measurement is taken upstream and one downstream using the same measuring path 1. The resulting transit time differential is proportional to the volumetric flow rate.

In this document, see page 115, right-hand column, figure, a flow channel is described in whose walls two sensors facing one another are situated. The faces from which the acoustic pulses are emitted face one another.

Furthermore, ultrasonic flow sensors are known from the related art, which use the beam drift effect within a flowing medium for measuring the flow velocity. Furthermore, ultrasonic transducers manufactured using micromechanical or film technology are known from the related art.

SUMMARY OF THE INVENTION

According to the present invention, an alternating arrangement of an ultrasonic transducer is proposed, which operates alternatingly as transmitter and receiver antennas in such a way that all emitted individual sonic waves interfere to form common wave fronts. The most striking advantage of the alternating arrangement is the interlaid transmitting and receiving areas achieving uniform coverage. Transmission and reception characteristics that are symmetrical to one another are thus achieved in combination with a single ultrasound reflection within a flow channel. The functional division of the ultrasonic transducer into transmitting and receiving elements makes it possible to effectively separate weak transmitted signals from strong received signals, whose amplitudes may differ by several orders of magnitude. The symmetry between transmission and reception allows for direct ultrasound back reflections on a surface that is symmetrical to the transducer array without phase shifts being required between the individual transducer elements in transmitting.

The transducer array provided according to the present invention may be manufactured, for example, from a silicon substrate having micromechanically produced separating trenches between the individual transducer elements for mutual isolation. Strip-shaped electrodes, over which a PVDF (polyvinylidene fluoride) film is applied as a thickness-mode transducer, are applied to the silicon substrate. The film is provided on its top with a flat counterelectrode and a seal for mechanical protection. The transmitting elements of the ultrasonic transducer according to the present invention are in direct electrical contact with one another outside the transducer array and are connected to an oscillator. This enables the transmitter elements to emit in-phase ultrasonic waves. The individual waves interfere to form common wave fronts, which in first approximation are flat and therefore propagate across the flowing medium. The opposite wall of the flow tube is curved with a radius of curvature which is preferably equal to twice the diameter of the tube through which the medium flows. Due to this arrangement, the ultrasonic waves are collimated at the site of the transducer array to an approximately linear focus, whose position is a linear function of the velocity of the flowing medium and provides the volumetric flow rate. Since no ideal linear focus is obtained, the receiving element is determined at the highest received intensity. This is accomplished with the aid of a comparator and a sample-&-hold amplifier, which may be both implemented as operational amplifiers.

BRIEF DESCRIPTION OF THE DRAWINGS

FIG. 1.1 shows a design variant of an analyzer circuit.

DETAILED DESCRIPTION

Figure 1:
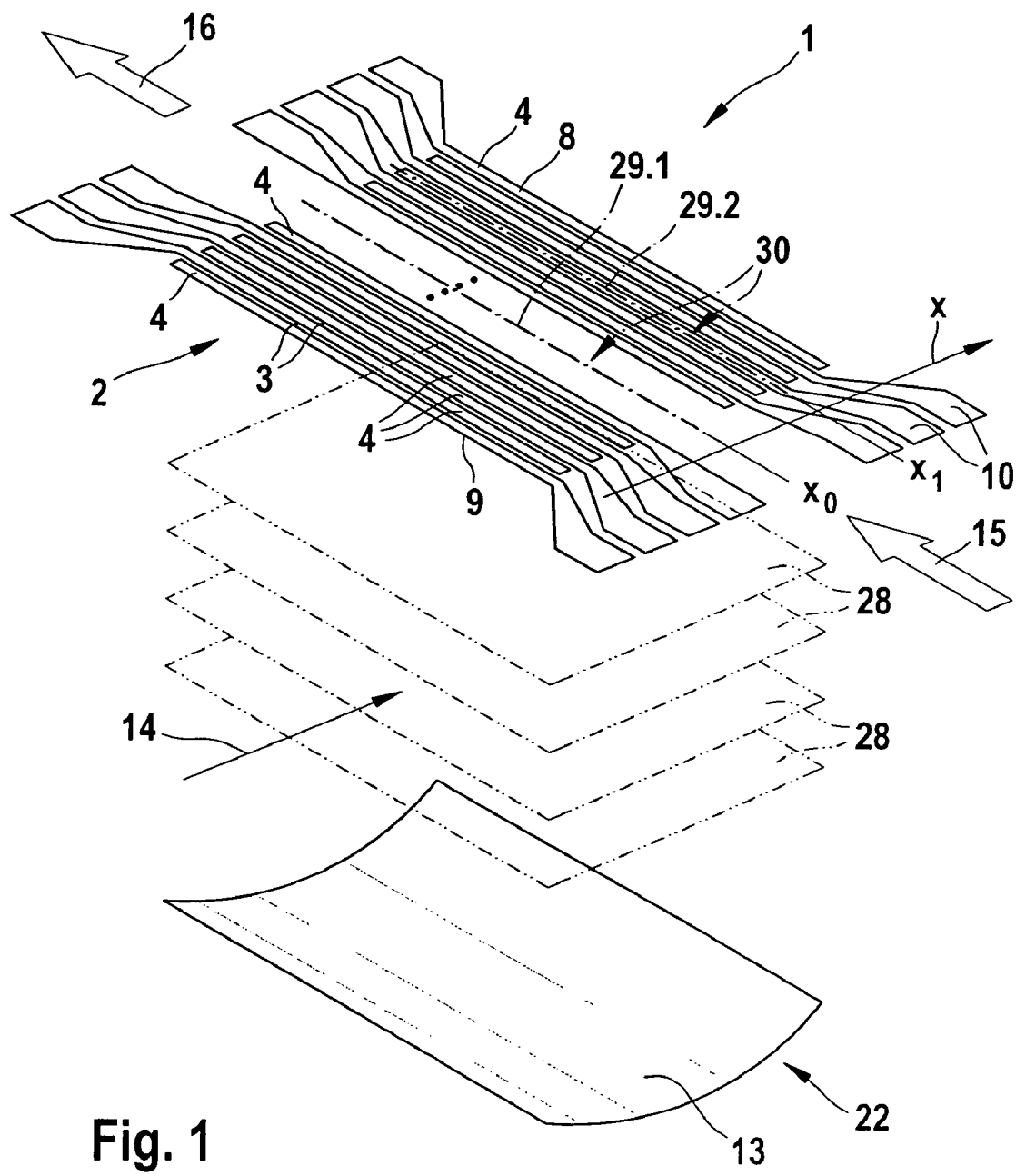
FIG. 1 shows an interlaid transmitting and receiving transducer array situated opposite a curved reflection surface.

An interlaid transducer array depicted in FIG. 1 is part of an ultrasonic flow sensor 1. The depicted interlaid transducer array is preferably manufactured from a silicon substrate. Individual transducer elements 4 of interlaid transducer array 2 are decoupled from one another by separating trenches 3. Separating trenches 3 are produced micromechanically. There are strip-shaped electrodes on the silicon substrate (see FIG. 4, item 11) representing interlaid transducer array 2. Strip-shaped electrodes 5 are covered by a PVDF (polyvinylidene fluoride) film 6 which is used as a thickness-mode transducer. The top side of PVDF (polyvinylidene fluoride) film 6 is provided with a flat counterelectrode 7 and a seal 12 for mechanical protection. Seal 12 may be made of epoxy resin or silicone, while counterelectrode 7 is preferably made of gold or aluminum. Strip-shaped electrodes 5 may be made of aluminum, gold, or platinum, while the substrate for ultrasonic transducer array 2 is preferably a silicon substrate. In one design variant, which is not graphically represented, shielding electrodes may be provided between the transmitting and receiving electrodes of ultrasonic transducer array 2, which allows both mechanical and electrical coupling. Silicon substrate 11, a strip-shaped electrode 5, an area of PVDF film 6, an area of counterelectrode 7, and, if present, also seal 12 applied to the latter belong to a transmitter element 10 (see FIG. 4). An area extends to the region between two adjacent separating trenches 3.

In FIG. 1, reference numeral 10 denotes the transmitting elements of interlaid transducer array 2.

All transmitting elements 10 are in direct electrical contact with one another outside interlaid transducer array 2. In addition, transmitting elements 10 are connected to an oscillator to enable emission of in-phase ultrasonic waves.

As is furthermore apparent from FIG. 1, interlaid transducer array 2 is oriented perpendicular to flow direction 14 of the flowing medium. Opposite interlaid transducer array 2, there is a curved reflection surface 13 (see also FIG. 2).

The transmitted signal is denoted by reference numeral 15, while the received signal is identified by reference numeral 16. In-phase ultrasonic waves 27 emitted by transmitting elements 10 of interlaid transducer array 2 interfere to form common wave fronts 28. Interference phenomena depend on the shape and variation of the ultrasonic waves due to deflection of molecules in air.

Individual ultrasonic waves 27 interfering to form wave fronts 28 are, in first approximation, flat and therefore propagate transversely to flow direction 14 of the medium. Propagating common wave fronts 28 strike an opposite wall of a flow tube 24, which has a radius of curvature 19. Radius of curvature 19 is preferably equal to twice the tube diameter 18 of flow tube 24 (r=2d). Due to curvature 23 of reflection surface 13, propagating wave fronts 28 are collimated to a linear focus 29 at the location of interlaid transducer array 2. Position 30 of linear focus is a linear function of the velocity of the medium flowing in flow direction 14. Due to the linear relationship between the flow velocity of the flowing medium and position 30 of linear focus, the volumetric flow rate of the flowing medium passing by interlaid transducer array 2 may be inferred. Since usually no ideal linear focus is established, the receiving element having the highest received intensity of the ultrasound signal is ascertained. FIG. 1 shows a first linear focus 29.1 at point $X_0$, which is established without a flowing medium. First linear focus 29.1 is shifted along the X axis to the point denoted by reference numeral 29.2 (see position $x_1$ on the X axis). The deflection of the linear focus from position 29.1 to 29.2 is caused by the deflection due to the medium flowing in flow direction 14. Reference numeral 28 denotes the interfering wave fronts propagating in the direction of a curved reflection surface 13.

FIG. 1.1 schematically shows an analyzer circuit. The analyzer circuit according to FIG. 1.1 includes a signal multiplexer 34, which is connected to interlaid transducer array 2. A signal processor 36 and a comparator 31 are connected downstream from signal-multiplexer 34. The receiver element having the highest received ultrasound intensity may be determined with the aid of comparator 31 and a sample-and-hold amplifier 32, which may also be designed as an operational amplifier. Signal multiplexer 34 is activatable via a multiplexer control 35. $U_1$ denotes the input voltage signal which is picked up at interlaid transducer array 2; $U_2$ denotes the voltage signal at the output of sample-and-hold amplifier 32. Alternatively, the center of gravity of the intensity distribution which is established over all strip-shaped electrodes 5 of interlaid transducer array 2 of ultrasonic flow sensor 1 may also be ascertained.

Figure 2:
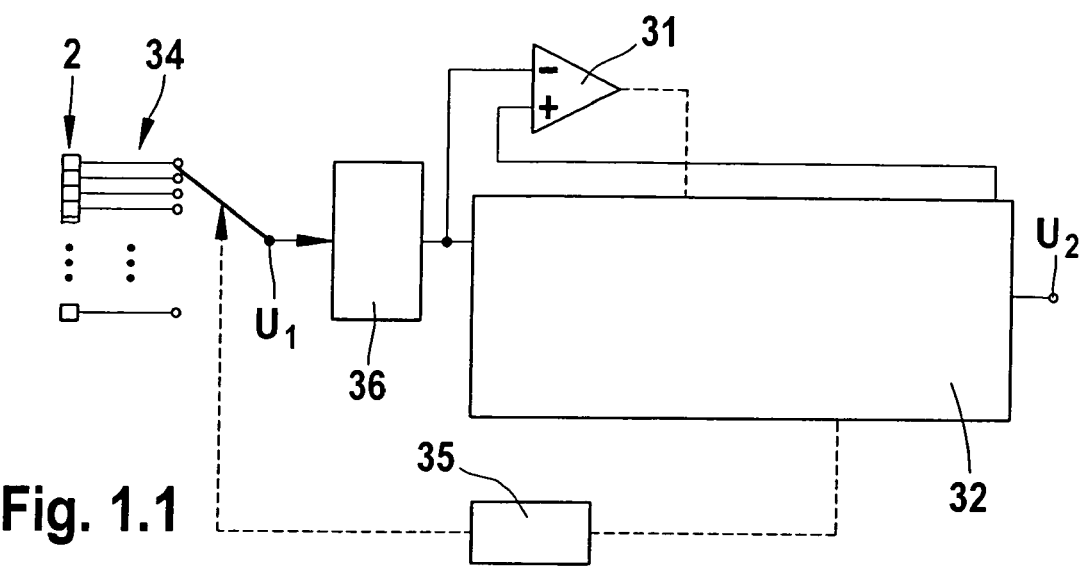
FIG. 2 shows a possible arrangement of the transducer array within the flow tube, the radius of curvature of the reflection surface being equal to twice the tube diameter.
Figure 2:
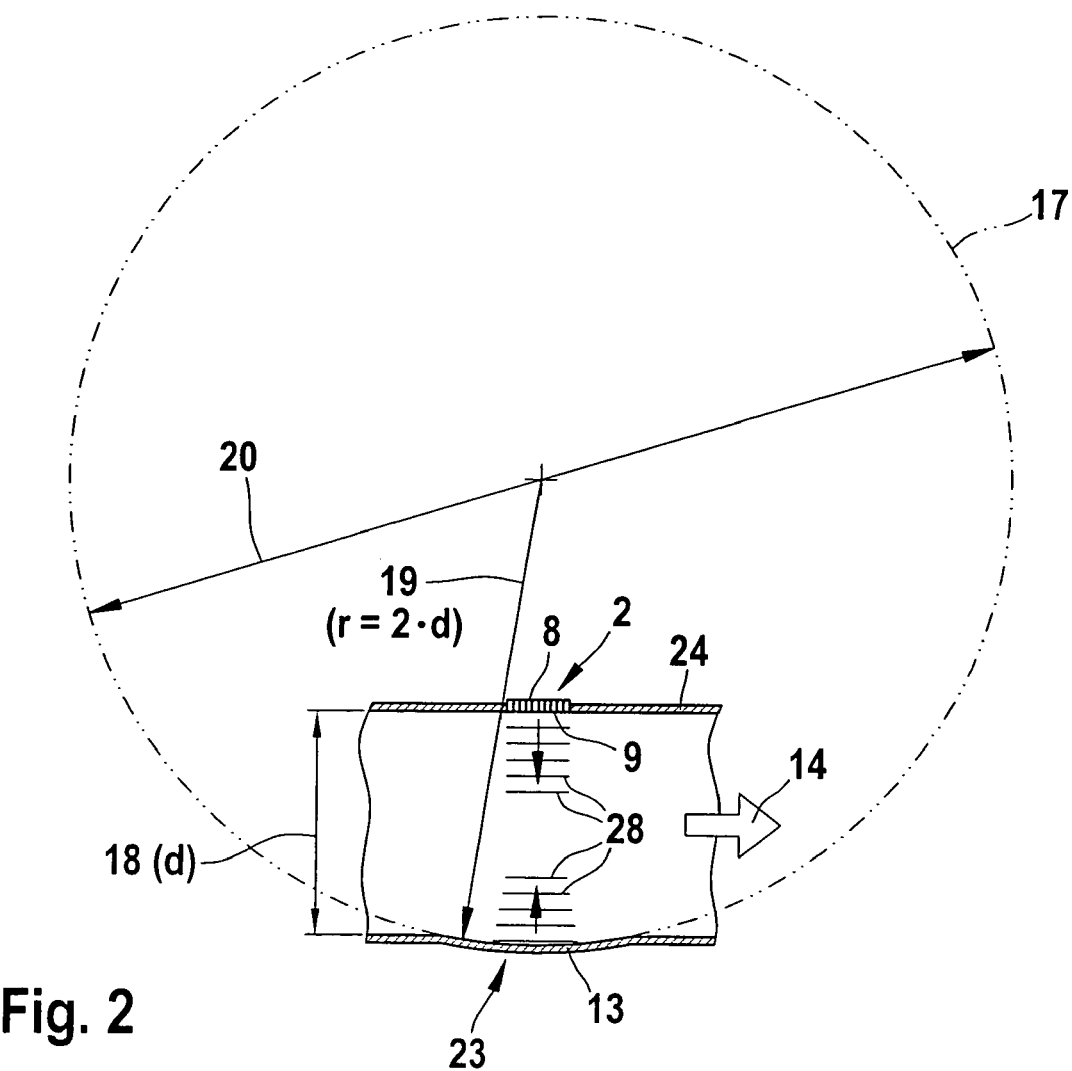

FIG. 2 depicts a cross section through a flow tube in which the interlaid ultrasonic transducer array according to the present invention is installed.

Flow tube 24 is delimited by a wall and has a diameter 18 (see d). Reflection surface 13 having a curvature 23 is integrated into the wall of flow tube 24. Radius of curvature 19 of reflection surface 13 is preferably twice the tube diameter 18. In FIG. 2, interlaid transducer array 2 is integrated into a wall of flow tube 24. The medium whose flow rate, i.e., volumetric flow, is to be ascertained flows in the right to left flow direction 14 in FIG. 2.

An auxiliary circle 17 has a diameter 20 and a radius 19, the radius 19 being approximately twice the diameter 18 of flow tube 24. Auxiliary circle 17 is used for indicating the curvature of curved reflection surface 13. FIG. 2 shows differing wave fronts 28 emitted by interlaid transducer array 2 and moving toward curved reflection surface 13 formed in curvature 23, and wave fronts 28 reflected by the reflection surface to the receiving elements of interlaid transducer array 2.

Figure 3:
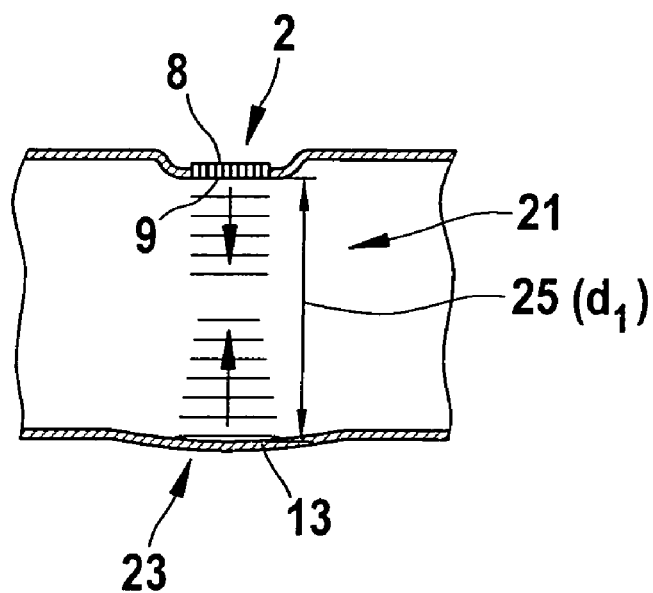
FIG. 3 shows the design of a flow-accelerating tube constriction formed by the arrangement of the transducer array.

FIG. 3 shows a design variant of an interlaid transducer array having a flow-accelerating tube constriction.

As is apparent from FIG. 3, interlaid transducer array 2 is installed in a surface of the tube wall of flow tube 24, which is formed in a curvature 23. Curvature 23 forms a surface depression within the tube wall of flow tube 24, so that the flow cross section between bottom 9 of interlaid transducer array 2 and the top of reflection surface 13 is constricted, which is indicated by distance 25 $d_1$, which is smaller than distance 18 d shown in FIG. 2 between flow tube 24 and the top of integrated reflection surface 13 integrated into the wall. In the design variant illustrated in FIG. 3, the cross section of flow tube 24 is constricted, so that the curvature cross section below interlaid transducer array 2 is narrowed overall and the flow is accelerated in flow direction 14. This makes it possible to effectively suppress the deposition of particles such as dust or the like on the inside of the wall of flow tube 24 and on bottom 9 of interlaid transducer array 2.

Figure 5:
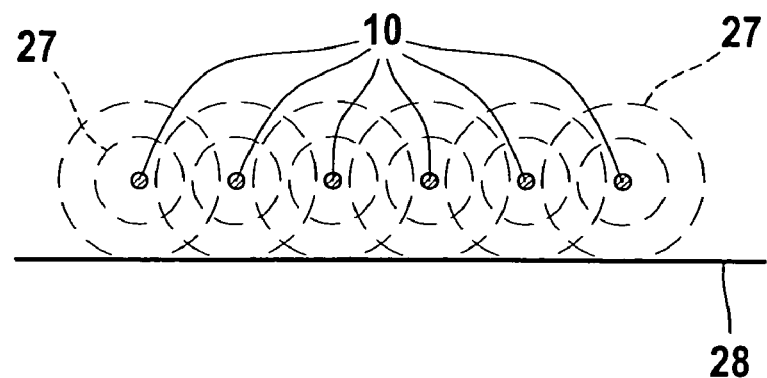
FIG. 5 shows interfering ultrasonic waves.
Figure 6:
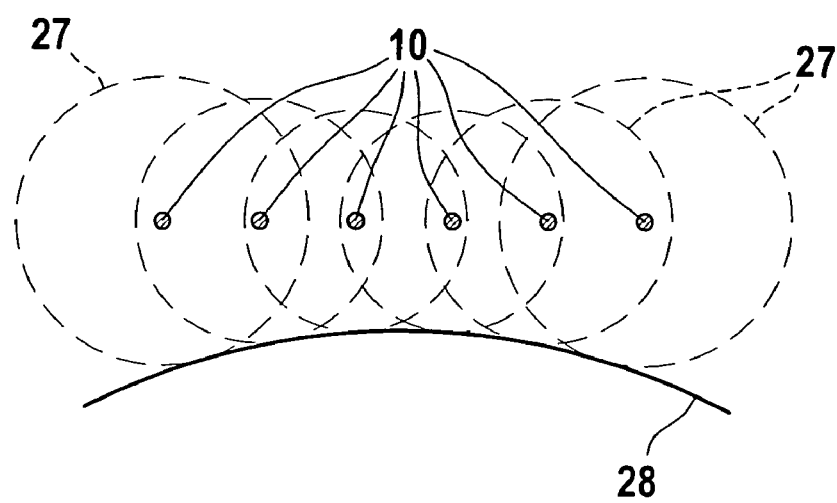
FIG. 6 shows a possible configuration of interfering wave fronts which cooperate with a curved reflection surface.

This makes forming a curvature in reflection surface 13 for beam collimation unnecessary if the individual transducer elements of the ultrasonic flow sensor are excited with a phase delay in such a way that the path difference between the individual ultrasonic waves 27 results in a curved or flat wave front 28 (see FIGS. 5 and 6). If these wave fronts 28 have a radius of curvature which is twice the tube diameter immediately after their emission, the waves converge after reflection on the opposite wall into a linear focus at the point of interlaid transducer array 2.

The determination of the receiving element having the highest intensity was described previously. Instead, a center of gravity of the intensity distribution of the received signal may also be determined, thus improving the measurement resolution. In general, reflection curvature 13 results in a cross-section widening and thus in a local reduction of the medium's flow velocity in flow direction 14 in flow tube 24. This may result in some cases in increased deposition of particles such as dust. Deposition of dust and other particles entrained in the flowing medium may be suppressed by the design variant depicted in FIG. 3. The interlaid transducer array 2 proposed according to the present invention makes an alternating arrangement of ultrasonic transducers possible which alternatingly act as transmitting and receiving antennas in such a way that all emitted individual sound waves 27 may interfere to form common ultrasonic wave fronts 28.

The advantage of the proposed alternating arrangement is the interlaid transmitting and receiving areas of uniform coverage whereby, in combination with a single ultrasound reflection within flow tube 24, a symmetric transmitting and receiving system may be achieved. The functional division into transmitting and receiving elements advantageously allows separating the weak transmitted signals from the strong received signals whose amplitudes may differ by several orders of magnitude. Symmetry regarding transmission and reception makes direct ultrasound reflection on a surface oriented symmetrically to the ultrasonic transducer array possible without requiring a phase shift between the individual transducer elements.

Figure 4:
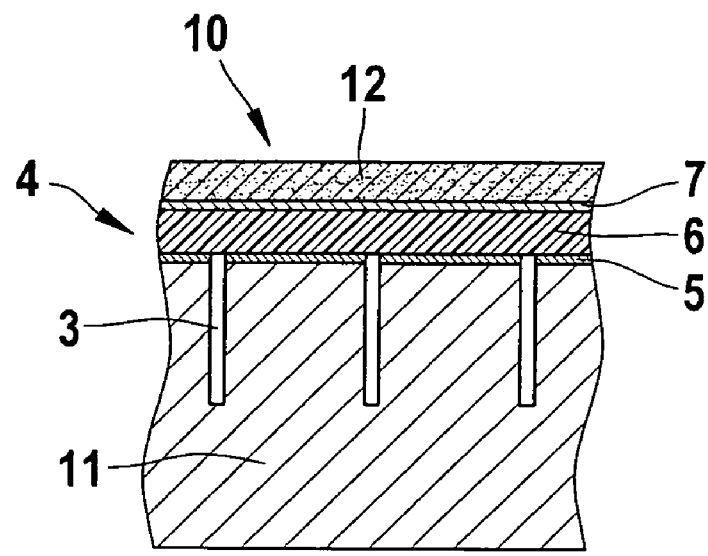
FIG. 4 shows a section through a transducer substrate on which the transducer array is formed.

FIG. 4 shows a cross section through a transducer element 4. Individual separating trenches 3 are formed in silicon substrate 11. Strip-shaped electrodes 5, over [which] PVDF film 6 is applied, are located on the top of silicon substrate 11. Flat counterelectrode 7, which is made of a metallic material such as gold, aluminum, or platinum, for example, is above PVDF film 6. A seal 12 in the form of an epoxy resin protective layer may optionally be applied on the top of flat counterelectrode 7. Reference numeral 10 denotes the top of a transmitting element depicted as an example in FIG. 4. Compared to the thickness of strip-shaped electrode 5 or flat counterelectrode 7, silicon substrate 11, which represents the carrier substrate, has a substantially greater thickness.

FIG. 5 shows individual ultrasonic waves 27 emitted by transmitting elements 10, which, due to their mutual overlapping, combine to form an interfering wave front 28. In FIG. 5, interfering wave front 28 which is formed runs essentially parallel. In contrast, the individual ultrasonic waves depicted in FIG. 6 run as curved wave fronts 28 due to a phase shift for collimating without curved reflection surface 13.

LIST OF REFERENCE NUMERALS 1 ultrasonic flow sensor
2 interlaid transducer array
3 separating trench
4 transducer element
5 strip-shaped electrode
6 PVDF film
7 flat counterelectrode
8 top
9 bottom
10 transmitting element
11 silicon substrate
12 epoxy resin protective layer
13 reflection surface
14 flow direction
15 transmitted signal
16 received signal
17 auxiliary circle
18 array-reflection surface distance (d)
19 radius of curvature, reflection surface
20 auxiliary circle diameter
21 tube constriction
22 curvature, reflection surface
23 curvature
24 flow pipe
25 $d_1$ (distance in flow constriction)
27 individual ultrasonic wave
28 interfering wave fronts (curved or parallel)
29.1 first linear focus (without flow)
29.2 second linear focus (with flow)
30 position of linear focus
31 comparator
32 sample-and-hold amplifier
34 signal multiplexer
35 multiplexer control
36 analog signal processing

What is claimed is:

1. An ultrasonic flow sensor for measuring a volumetric flow rate of a flowing medium through a flow channel, comprising:
    an interlaid ultrasonic transducer array situated within a flow cross section of the flow channel and that generates ultrasonic waves that propagate in the flow cross section of the flow channel transversally to a flow direction of the flowing medium,
    a linear focus of the ultrasonic waves having at least a first position and a second position, the difference in position being indicative of the volumetric flow rate of the flowing medium, wherein:
    the interlaid ultrasonic transducer array includes an interlaid arrangement of transducer elements that act alternately as transmitting and receiving elements, so that all emitted individual sound waves interfere to form common wave fronts.

2. The ultrasonic flow sensor as recited in claim 1, wherein the individual transducer elements in the interlaid transducer array are decoupled from one another by separating trenches.

3. The ultrasonic flow sensor as recited in claim 1, further comprising:
    a reflecting surface associated with the interlaid ultrasonic transducer array and having a radius of curvature, the reflecting surface being separated from the interlaid ultrasonic transducer array by a distance.

4. The ultrasonic flow sensor as recited in claim 3, wherein the radius of curvature of the reflecting surface is twice a tube diameter of the flow channel.

5. The ultrasonic flow sensor as recited in claim 1, wherein the interlaid ultrasonic transducer array is mounted on a wall causing a cross-section narrowing of a partial flow cross section of the flow channel.

6. The ultrasonic flow sensor as recited in claim 5, wherein a constriction of the flow channel causing the cross-section narrowing contains curvatures pointed toward the reflecting surface.

7. The ultrasonic flow sensor as recited in claim 1, further comprising:
    an analyzer circuit for scanning the individual transducer elements of the interlaid ultrasonic transducer array using a controllable signal multiplexer; and
    an analog signal processor to which the controllable signal multiplexer supplies signals received by the individual transducer elements, wherein the analog signal includes a comparator and a sample-and-hold amplifier connected downstream from the comparator.

8. The ultrasonic flow sensor as recited in claim 1, wherein the interlaid ultrasonic transducer array includes strip-shaped electrodes on a top side that are separated from flat counterelectrodes by a PVDF film.

9. The ultrasonic flow sensor as recited in claim 8, further comprising a seal above the flat counterelectrodes.

10. The ultrasonic flow sensor as recited in claim 1, wherein a shift of the linear focus of the ultrasonic waves from a first position to a second position is detected.

* * * * *